United States Patent [19]

Weinstein

[11] Patent Number: 4,493,211

[45] Date of Patent: Jan. 15, 1985

[54] CONTINUOUS LAMINAR SMOKE GENERATOR

[75] Inventor: Leonard M. Weinstein, Newport News, Va.

[73] Assignee: The United States of America as represented by the Administrator of the National Aeronautics and Space Administration, Washington, D.C.

[21] Appl. No.: 527,918

[22] Filed: Aug. 30, 1983

[51] Int. Cl.³ .............................................. G01M 9/00
[52] U.S. Cl. ..................................................... 73/147
[58] Field of Search ........................................... 73/147

[56] References Cited

U.S. PATENT DOCUMENTS

| | | | |
|---|---|---|---|
| 1,676,984 | 7/1928 | Fales et al. | 73/147 |
| 2,311,199 | 2/1943 | Astradsson | 73/189 |
| 2,324,359 | 7/1943 | Callan | 252/359 A |
| 2,437,963 | 3/1948 | Langmuir et al. | 73/147 |
| 2,836,567 | 5/1958 | Reure et al. | 252/359 |
| 3,017,367 | 1/1962 | Persechino | 252/359 |
| 3,869,909 | 3/1975 | Hale et al. | 73/147 |
| 3,964,304 | 6/1976 | Parrish | 73/147 |

OTHER PUBLICATIONS

"Space Spinoff: Improved Smoke Generator for Wind Tunnels", Heating/Piping/Air Conditioning, Dec., 1971, p. 30.

Primary Examiner—Donald O. Woodiel
Attorney, Agent, or Firm—Howard J. Osborn; John R. Manning

[57] ABSTRACT

The invention relates to a smoke generator capable of emitting a very thin, laminar stream of smoke for use in high detail flow visualization. The generator is also capable of emitting a larger but less stable "rope" of smoke. The invention consists of a pressure supply 29, and fluid supply 28, which supply smoke generating fluid 25 to feed tube 22. Feed tube 22 is directly heated by electrical resistance from current supplied by power supply 30 and regulated by constant temperature controller 32. Smoke exit hole 21 is drilled in the wall of feed tube 22. Because feed tube 22 is heated both before and past exit hole 21, no condensation of smoke generating fluid occurs at the smoke exit hole, enabling the production of a very stable smoke filament 16. The generator is small in size, thereby avoiding wind turbulence in front of the test model 11.

11 Claims, 3 Drawing Figures

CONTINUOUS LAMINAR SMOKE GENERATOR

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

The present invention relates generally to an apparatus for vapor production and more particularly to a compact smoke generator capable of emitting either a dense and extremely thin, laminar filament of smoke or large streams of smoke.

The use of smoke generation to aid flow visualization has long been known in the field of wind tunnel research. Early smoke generators had several major drawbacks, however; they were bulky and could only produce large volumes of turbulent smoke. Recently, compact smoke generators, such as Parrish, U.S. Pat. No. 3,964,304 have been developed. A compact generator does not significantly disturb airflow around the test article, a problem associated with former models. As aerodynamics technology has increased, however, the need has arisen for a compact smoke generator which can emit an extremely thin and stable filament of smoke. Such a filament is very useful for visualizing flow in detail.

A stable filament of smoke with small diameter and high density has not been provided by prior art generators because the circumference of the smoke exit hole in such generators was subject to atmospheric cooling which causes condensation of smoke generating fluid at the smoke exit. A smoke exit hole located at the termination of the smoke feed tube cannot avoid atmospheric cooling. Other prior art devices generated smoke in a chamber and fed the smoke to a small tube. Such devices provide low density smoke streams, however. Thus, it is seen that prior art smoke generators produced either large diameter or low density smoke streams.

It is therefore an object of the present invention to provide a smoke generator capable of emitting an extremely thin laminar stream of dense smoke.

Another object of the present invention is a smoke generator with the capability of indicating airflow around a model in an operating wind tunnel, with a negligible adverse effect thereon.

A further object of the present invention is to provide a smoke generator capable of generating a large volume of smoke.

Another object of the present invention is to provide a generating oil feed tube which is directly heated by electrical resistance.

Yet another object of the present invention is to provide a smoke generator which makes efficient use of smoke generating oil, is easy to operate, and which requires minimal adjustment while in operation.

It is another object of the present invention to provide a smoke exit hole with a circumference that is directly heated by locating the hole away from the termination of, and in the wall of, the oil feed tube.

BRIEF SUMMARY OF THE INVENTION

According to the present invention, the foregoing and other objects are attained by providing a feed tube which is directly heated by electrical resistance. Smoke generating fluid is supplied to one end of the tube, a smoke exit hole is provided in the wall of the tube, and the other end of the tube is sealed. The heated portion of the feed tube extends beyond the smoke exit hole to avoid condensation of the smoke generating fluid. The fluid is heated as it passes through the tube and produces a dense smoke which issues from the exit hole in the tube.

BRIEF DESCRIPTION OF THE DRAWINGS

A more complete appreciation of the invention and many of the advantages thereof will be readily apparent by reference to the following detailed description when considered in connection with the accompanying drawings wherein.

DETAILED DESCRIPTION OF THE INVENTION

Figure 1:
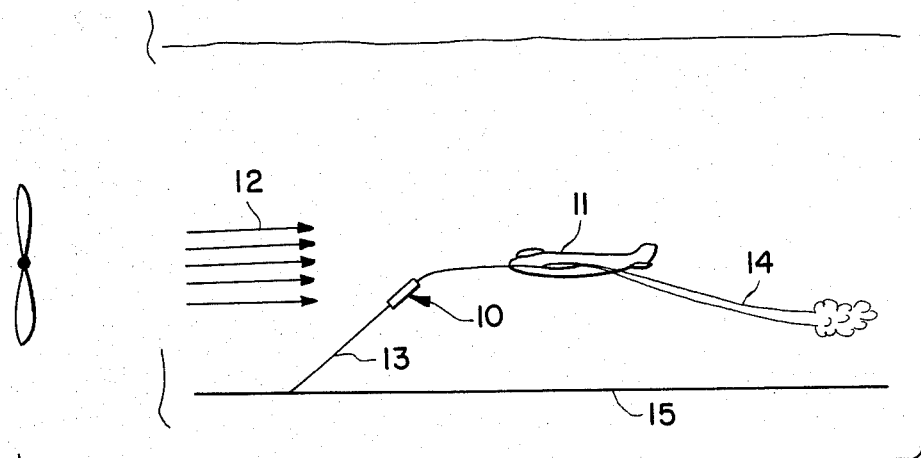
FIG. 1 an illustration of the smoke generator of the present invention in operation.

Referring now to the drawings, the smoke generator 10 is depicted in FIG. 1 as attached to support wand 13 in a typical wind tunnel 15. The airflow 12 blows the smoke stream produced by the generator 10 past aircraft model 11 indicating the airflow over model 11 as well as resultant airflow 14.

Figure 2:
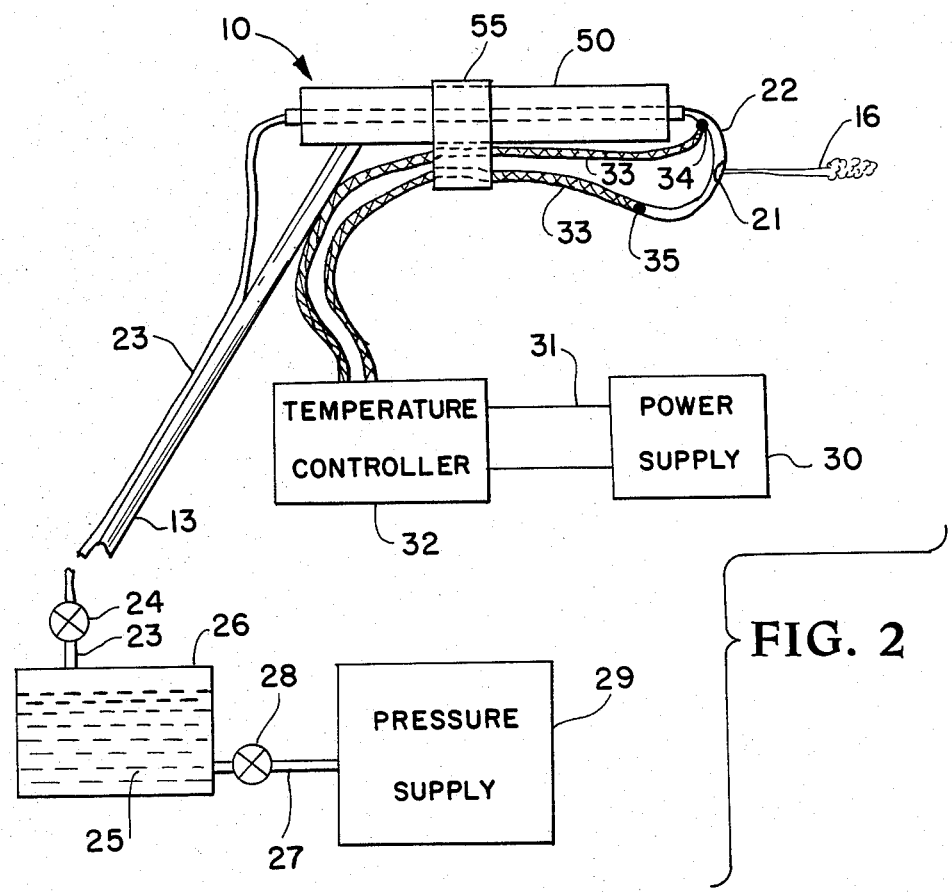
FIG. 2 is a part schematic illustration of the smoke generator shown in FIG. 1 with its attendant power and fluid supply system.

In FIG. 2, smoke generator 10 is shown mounted on the end of support wand 13. A holder 50 serves to support the various tubes and wires of the generator 10 upon the support wand 13, and in the illustrated embodiment holder 50 is a wooden dowel which has an axially drilled hole through which connecting tubing 23 passes. Fluid 25 for providing smoke is forced into smoke generator 10 by pressure within fluid supply vessel 26. To produce a single laminar filament of smoke, 10psi of air pressure is provided from pressure supply 29 through pressure valve 28 and connecting tubing 27. If pressure is increased to 30–50 psi, a larger but turbulent "rope" of smoke can be produced. Fluid supply vessel 26 is connected to the electrically heated feed tube 22 by connecting tubing 23. Connecting tubing 23 has one end in fluid connection with supply vessel 26, travels up the support wand 13 and through holder 50 to where it is in fluid connection with electrically heated feed tube 22. To provide control over the flow of smoke producing fluid 25, a needle valve 24 is installed in connecting tubing 23 near fluid supply vessel 26.

Feed tube 22 is directly heated by electrical resistance due to current supplied by power supply 30. Power supply 30 provides current to feed tube 22 via electrical wires 33. Wires 33 travel up support wand 13, are secured to holder 50 with tape 55, and are soldered to feed tube 22 at solder joints 34, 35. Fluid 25 is heated to boiling within feed tube 22 and issues as smoke from exit hole 21 drilled in the wall of feed tube 22. Exit hole 21 is located before the end of heated feed tube 22 to avoid condensation of fluid 25 near the exit hole which would destabilize the laminar smoke stream at very low feed rates used by the present generator.

The maintenance of boiling temperature in feed tube 22 is necessary to the successful operation of the smoke generator. As fluid flow rate changes, however, the ability of a given amount of current to heat the feed tube also changes. As the fluid flows faster, current must be increased in order to maintain boiling temperature. Thus, a constant temperature controller 32 is needed to vary current supplied from power supply 30 to feed tube 22.

Figure 3:
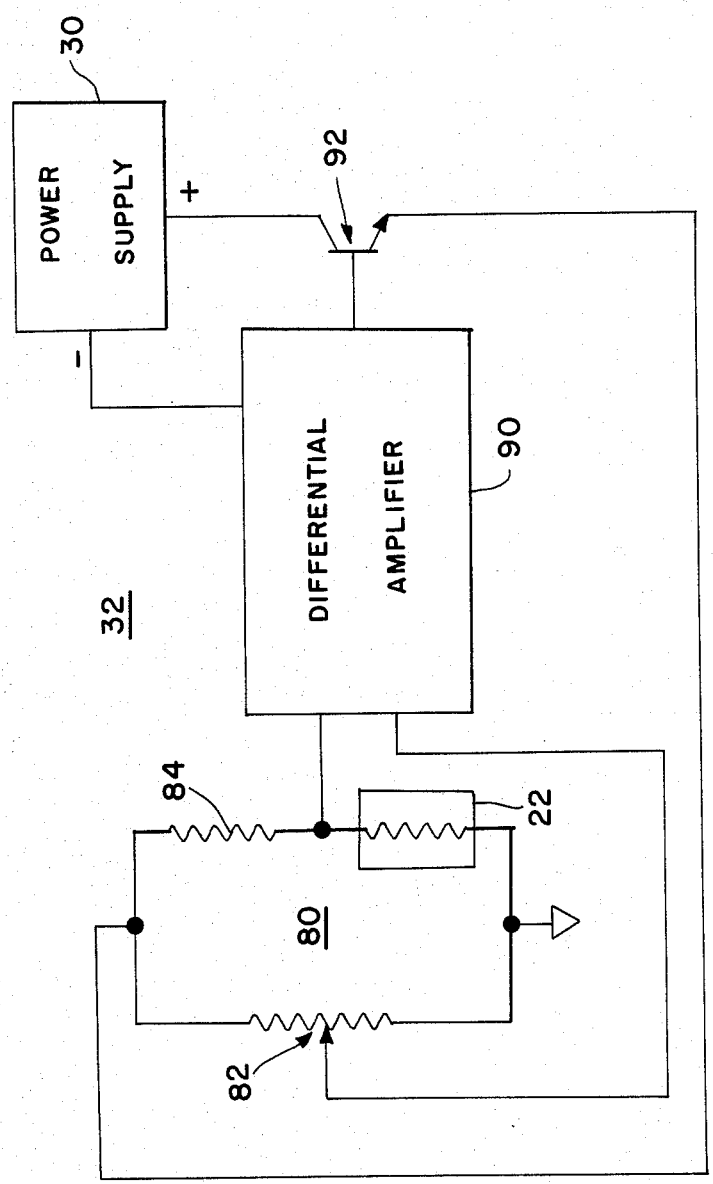
FIG. 3 is a schematic illustration of the temperature controller circuit of the present invention.

In FIG. 3, the constant temperature controller circuit of the preferred embodiment is schematically illustrated. Feed tube 22 comprises one leg of a Wheatstone bridge 80, and resistor 84 comprises a second leg. As the temperature of feed tube 22 varies from the valve chosen on variable resistor 82 which comprises the third leg of the Wheatstone bridge 80, an imbalance occurs in the bridge. This imbalance is sensed and further amplified by the circuit differential amplifier 90, and a reference voltage in response thereto is supplied to transistor 92. Transistor 92, in response to the reference voltage, varies current supplied to the feed tube 22 to maintain the preselected temperature.

In the preferred embodiment, feed tube 22 is a hollow stainless steel wire with outside diameter 0.50 mm and inside diameter 0.25 mm. One end of feed tube 22 is sealed at point 35 where one electrical wire 33 from temperature controller 32 is silver-soldered to feed tube 22. The other electrical wire 33 from temperature controller 32 is silver-soldered at point 34 to feed tube 22 near holder 50, thereby completing the circuit comprised of the power supply 30, temperature controller 32 and feed tube 22. Exit hole 21 with 0.5 mm diameter is drilled in the wall of feed tube 22. The preferred smoke producing fluid is TEM Smoke Oil (TEM, England) which is heated to boiling by 5amps at 2 volts supplied by a 12 volt power supply 30 (Model HYSI 60-5, Hyperon Instruments) in the preferred embodiment. Boiling temperature is automatically maintained by a known resistance feedback circuit comprised of a Wheatstone bridge and a feedback amplified power transistor located in temperature controller 32. As illustrated in FIG. 3, the heated feed tube 22 comprises one leg of the Wheatstone bridge 80. Alternatively, temperature can be manually maintained by a variable transformer (not shown) and a suitable temperature sensing means (not shown) such as a thermocouple and a voltmeter. The total size of the assembled generator is 60 cm in length by 0.6 cm in diameter which includes feed tube 22, wires 33, and holder 50 wrapped with tape 55. The stream of smoke produced by this preferred embodiment remains laminar at 11 meters/second tunnel velocity because the circumference of exit hole 21 is directly heated and the tube is below eddy shedding velocity. Directly heating the circumference of the exit hole 21 avoids condensation at the exit hole which in turn causes turbulence in the smoke stream.

OPERATION

Operation of the invention should now be apparent. Opening pressure valve 28 pressurizes filled fluid supply vessel 26. Needle valve 24 is opened to allow fluid to flow through the generator, and electrical power supply 30 is turned on. Temperature controller 32 supplies current to feed tube 22, which causes the heating of feed tube 22. By sensing changes in feed tube resistance, temperature controller 32 varies current supplied to maintain a preselected feed tube temperature at the boiling point of the fluid. Smoke stream 16 issues from exit hole 21.

To adjust the volume of smoke produced, needle valve 24 is adjusted to increase or decrease the fluid flow rate, while temperature controller 32 continues to supply adequate power to boil the fluid. A laminar stream of smoke can be produced at low volume flow, and a more voluminous rope of smoke is obtained at high volume.

Although the invention has been described relative to a specific embodiment, it is not so limited and many modifications and variations thereof will be readily apparent to those skilled in the art in light of the above teachings. For example, any corrosion resistant material with a non-negligible temperature coefficient of resistivity can be used to fabricate feed tube 22. Also, any suitable liquid that produces visible vapor when heated may be used depending on the vapor desired by adjusting the pressure, flow rate and temperature of the fluid passing through feed tube 22.

A further variation, practical when the generator is not mounted on a support wand, allows for the elimination of the pressure supply by raising the fluid supply 26 above the height of the feed tube 22 and allowing gravity to create the pressure needed to propel the fluid.

What is claimed as new and desired to be secured by Letters Patent of the United States is:

1. A smoke generator to produce smoke for visually indicating airflow comprising:
   a fluid supply means;
   a fluid capable of producing smoke within said fluid supply means;
   a pressure supply means in connection with said fluid supply means for moving said fluid;
   a feed tube means having a wall and a closed end, said feed tube means in fluid connection with said fluid supply means;
   heating means for directly heating at least a portion of said feed tube; and
   a smoke exit hole located in the wall of said directly heated portion of said feed tube such that the circumference of said exit hole does not coincide with the closed end of said feed tube.

2. The apparatus of claim 1 wherein said feed tube means is a hollow strand of material with a non-negligible temperature coefficient of resistivity.

3. The apparatus of claim 1 wherein said pressure supply means is a vessel of pressurized air.

4. The apparatus of claim 1 wherein said pressure supply means is a vessel of vapor producing fluid acted upon by gravity.

5. The apparatus of claim 1 wherein said feed tube means has one end sealed, one end in connection with said fluid supply means, and a smoke exit hole drilled in the wall of said feed tube between said ends to avoid the condensation of said fluid at the circumference of said hole.

6. The apparatus of claim 1 wherein said heating means includes an electrical power supply in electrical connection with said feed tube means.

7. The apparatus of claim 1 wherein said feed tube means is a hollow strand of stainless steel wire.

8. The apparatus of claim 1 wherein said fluid means is oil having the property of readily generating smoke when heated.

9. The apparatus of claim 1 wherein said heating means further includes temperature controller means comprised of a feedback amplified power transistor and a Wheatstone bridge in which one leg of said Wheatstone bridge is said feed tube.

10. A method of producing an extremely thin, laminar stream of smoke comprising:
- providing a fluid supply vessel containing a fluid capable of producing smoke and having several fluid lines leading thereto and therefrom;
- applying pressure to the fluid supply;
- connecting a feed tube having a closed end and a non-negligible temperature coefficient of resistivity to the fluid supply;
- drilling a smoke exit hole in the wall of the feed tube such that the entire circumference of the exit hole is heated;
- starting the flow of fluid to the feed tube;
- applying resistence heating to the feed tube and maintaining constant temperature of the feed tube with a constant temperature controller causing the heated feed tube to vaporize the fluid resulting in a thin, laminar stream of smoke issuing from the smoke exit hole.

11. The method of claim 10 wherein the step of applying pressure is accomplished by utilizing the force of gravity.

* * * * *